US009856596B2

(12) United States Patent
Kim et al.

(10) Patent No.: US 9,856,596 B2
(45) Date of Patent: Jan. 2, 2018

(54) CLOTHES TREATING APPARATUS WITH HOT AIR SUPPLY DEVICE AND AN OPERATING METHOD THEREOF

(71) Applicant: LG Electronics Inc., Seoul (KR)

(72) Inventors: Jongryul Kim, Gyeongsangnam-do (KR); Sungjun Kim, Gyeongsangnam-do (KR); Youngsoo Kim, Gyeongsangnam-do (KR); Geunhyung Lee, Gyeongsangnam-do (KR); Jeonggeol Roh, Gyeongsangnam-do (KR)

(73) Assignee: LG Electronics Inc., Seoul (KR)

( * ) Notice: Subject to any disclaimer, the term of this patent is extended or adjusted under 35 U.S.C. 154(b) by 574 days.

(21) Appl. No.: 14/085,009

(22) Filed: Nov. 20, 2013

(65) Prior Publication Data

US 2014/0137429 A1 May 22, 2014

(30) Foreign Application Priority Data

Nov. 21, 2012 (KR) ........................ 10-2012-0132564

(51) Int. Cl.
*F26B 21/06* (2006.01)
*F26B 19/00* (2006.01)
(Continued)

(52) U.S. Cl.
CPC .............. *D06F 58/28* (2013.01); *D06F 58/26* (2013.01); *D06F 58/263* (2013.01)

(58) Field of Classification Search
CPC ..... D06F 2058/2829; D06F 2058/2854; D06F 58/26; D06F 58/263; D06F 2058/2806;
(Continued)

(56) References Cited

U.S. PATENT DOCUMENTS 3,583,688 A 6/1971 Fuqua et al.
3,942,265 A * 3/1976 Sisler ...................... D06F 58/28 34/527

(Continued)

FOREIGN PATENT DOCUMENTS

CN 102758343 10/2012
JP 04-300598 A 10/1992

(Continued)

OTHER PUBLICATIONS

Extended European Search Report issued in European Application No. 13193696.5 dated Feb. 26, 2016, 9 pages.

*Primary Examiner* — John McCormack
(74) *Attorney, Agent, or Firm* — Fish & Richardson P.C.

(57) ABSTRACT

The present disclosure relates to a clothes treating apparatus having a hot air supply device and an operating method thereof, and according to an aspect of the present disclosure, a clothes treating apparatus may include a drum configured to accommodate an object to be dried; a linear valve configured to linearly adjust the amount of supplied gas; a burner configured to burn gas supplied by the linear valve; a hot air supply device configured to supply hot air heated by the burner into the drum; a temperature sensor configured to measure the temperature of air exhausted from the drum; and a control means configured to adjust the amount of gas supplied to the burner based on a temperature measured by the temperature sensor, wherein the control means partitions a drying process into a plurality of sections based on a temperature change of the exhaust air, and varies a gas supply amount for each section.

10 Claims, 7 Drawing Sheets

(51) Int. Cl.
*D06F 58/28* (2006.01)
*D06F 58/26* (2006.01)

(58) Field of Classification Search
CPC ....... D06F 2058/2812; D06F 2058/289; D06F 2058/2893; D06F 2058/2851; D06F 2058/2896
USPC ................................ 34/551, 539; 431/36, 37
See application file for complete search history.

(56) References Cited

U.S. PATENT DOCUMENTS

| | | | | | |
|---|---|---|---|---|---|
| 4,195,415 | A * | 4/1980 | Livings | D06F 58/28 | 219/497 |
| 4,649,654 | A * | 3/1987 | Hikino | D06F 58/28 | 34/493 |
| 4,827,627 | A | 5/1989 | Cardoso | | |
| 6,199,300 | B1 * | 3/2001 | Heater | D06F 58/28 | 34/446 |
| 2008/0313922 | A1 * | 12/2008 | Bae | D06F 58/203 | 34/491 |
| 2010/0319213 | A1 * | 12/2010 | Kim | D06F 58/26 | 34/565 |
| 2012/0017463 | A1 * | 1/2012 | Prajescu | D06F 58/26 | 34/487 |

FOREIGN PATENT DOCUMENTS

| | | |
|---|---|---|
| JP | 2000-271399 | 10/2000 |
| JP | 2005-185850 | 7/2005 |

* cited by examiner

CLOTHES TREATING APPARATUS WITH HOT AIR SUPPLY DEVICE AND AN OPERATING METHOD THEREOF

CROSS-REFERENCE TO RELATED APPLICATIONS

The present disclosure relates to subject matter contained in priority Korean Application No. 10-2012-0132564, filed on Nov. 21, 2012, which is herein expressly incorporated by reference in its entirety.

BACKGROUND OF THE INVENTION

1. Field of the Invention

The present disclosure relates to a clothes treating apparatus having a hot air supply device and an operating method thereof.

2. Description of the Related Art

In general, a clothes treating apparatus as a device for supplying hot air generated by a heater into the drum and absorbing the moisture of an object to be dried to perform drying on the object to be dried, and can be largely classified into an exhaust type clothes dryer and a condensation type clothes dryer according to the method of treating humid air that is generated by absorbing moisture to dry the object to be dried.

Furthermore, the hot air can be heated using any method, and as an example, it may be divided into a gas type dryer for burning fossil fuels such as gas or the like to obtain the amount of heat and an electric type dryer for obtaining the amount of heat using electrical energy. Of them, the gas type dryer has an advantage in that the maintenance cost is relatively low compared to the electric type dryer.

On the other hand, in order to optimally maintain the dry performance as well as reduce the damage of the object to be dried therein, it may be required to maintain the temperature of hot air within a suitable temperature range. To this end, as disclosed in Korean Patent No. 10-2009-0024163 (Title of Invention: Apparatus and method for controlling ignition of gas dryer), the temperature of supplied hot air is measured using a temperature sensor or the like, and the amount of fuel supplied to the burner is adjusted according to the measured temperature of hot air, thereby allowing hot air to maintain an optimal temperature range.

However, according to the foregoing related art, the operation of the burner is merely controlled based on only the temperature of supplied hot air, and an environmental change due to the drying process is not properly reflected, and thus there is a limit in reducing the amount of energy consumption.

SUMMARY OF THE INVENTION

The present disclosure is contrived to overcome the foregoing drawbacks in the related art, and a technical task of the present disclosure is to provide an operating method of a clothes treating apparatus capable of reducing the amount of gas used.

Furthermore, another technical task of the present disclosure is to provide a clothes treating apparatus capable of reducing the amount of gas used during the drying process using the foregoing operating method.

In order to accomplish the foregoing technical tasks, according to an aspect of the present disclosure, there is provided a clothes treating apparatus including a drum configured to accommodate an object to be dried; a linear valve configured to linearly adjust the amount of supplied gas; a burner configured to burn gas supplied by the linear valve; a hot air supply device configured to supply hot air heated by the burner into the drum; a temperature sensor configured to measure the temperature of air exhausted from the drum; and a control means configured to adjust the amount of gas supplied to the burner based on a temperature measured by the temperature sensor, wherein the control means partitions a drying process into a plurality of sections based on a temperature change of the exhaust air, and varies a gas supply amount for each section.

Here, the plurality of sections may be partitioned to include a first heating section located at the beginning of the drying process; an evaporation section located subsequent to the first heating section to activate moisture evaporation from the object to be dried so as to have a relatively low temperature increase rate; and a second heating section located subsequent to the evaporation section to have a relatively high temperature increase rate.

At this time, the control means may control a gas supply amount during the first heating section to be relatively greater than that during the evaporation section. Furthermore, the control means may control such that the highest amount of gas is supplied during the first heating section.

On the other hand, the control means may control a gas supply amount during the second heating section to be relatively less than that during the evaporation section. Here, the control means may control such that the lowest amount of gas is supplied during the second heating section.

Furthermore, the amount of supplied gas may be constantly maintained within each section. In addition, the control means may determine the weight of an object to be dried therein based on a temperature increase rate per hour at the beginning of the first heating section, and determine an initial gas input amount according to the determined weight.

According to another aspect of the present disclosure, there is provided a clothes treating apparatus including a drum configured to accommodate an object to be dried; a linear valve configured to linearly adjust the amount of supplied gas; a burner configured to burn gas supplied by the linear valve; a hot air supply device configured to supply hot air heated by the burner into the drum; a temperature sensor configured to measure the temperature of air exhausted from the drum; a selection means configured to select one of a plurality of drying courses with variant gas supply modes; and a control means configured to adjust the amount of gas supplied to the burner based on a temperature measured by the temperature sensor and the selected drying course, wherein the control means partitions a drying process into a plurality of sections based on a temperature change of the exhaust air, and varies a gas supply amount for each section based on the selected drying course.

Here, the plurality of sections may be partitioned to include a first heating section located at the beginning of the drying process; an evaporation section located subsequent to the first heating section to activate moisture evaporation from the object to be dried so as to have a relatively low temperature increase rate; and a second heating section located subsequent to the evaporation section to have a relatively high temperature increase rate.

Furthermore, a gas supply amount during the first heating section may be greater than that during the evaporation section for at least one drying course. At this time, a gas supply amount during the second heating section may be less than that during the evaporation section for the at least one drying course.

Furthermore, gas supply amounts during the first heating section and evaporation section may be the same, and the clothes treating apparatus may further include a drying course with a relatively low gas supply amount during the second evaporation section.

Here, the control means may determine the weight of an object to be dried therein based on a temperature increase rate per hour at the beginning of the first heating section, and determine an initial gas input amount according to the determined weight.

According to aspects of the present disclosure having the foregoing configuration, an overall drying section may be partitioned according to the drying status as well as the temperature of hot air supplied to the drum, and then accordingly, the gas supply amount may be varied, thereby decreasing the drying time as well as reducing the amount of gas used.

Moreover, it may be possible to reduce the gas supply amount in the latter half of the drying process while preventing unnecessary energy consumption as well as reducing the damage of fabrics.

In addition, the weight of an object to be dried may be measured based on a temperature increase rate at the beginning of the drying process to know the weight of the object to be dried with no installation of an additional weight sensor, and as a result, an initial gas input amount can be determined at an optimal level, thereby further reducing the energy consumption amount.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a clothes treating apparatus according to an embodiment of the present disclosure will be described in detail with reference to the accompanying drawings.

Figure 1:
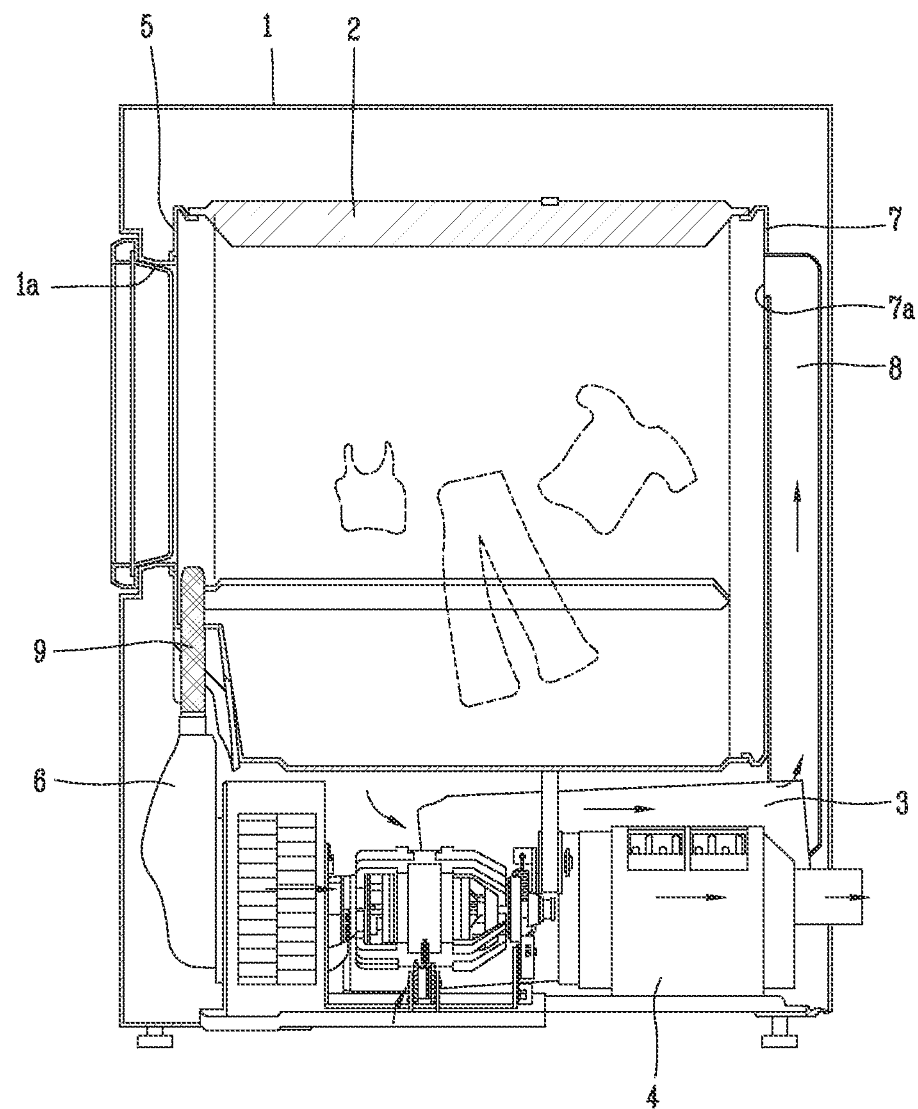
FIG. 1 is a longitudinal cross-sectional view illustrating a clothes treating apparatus according to the present disclosure.
Figure 2:
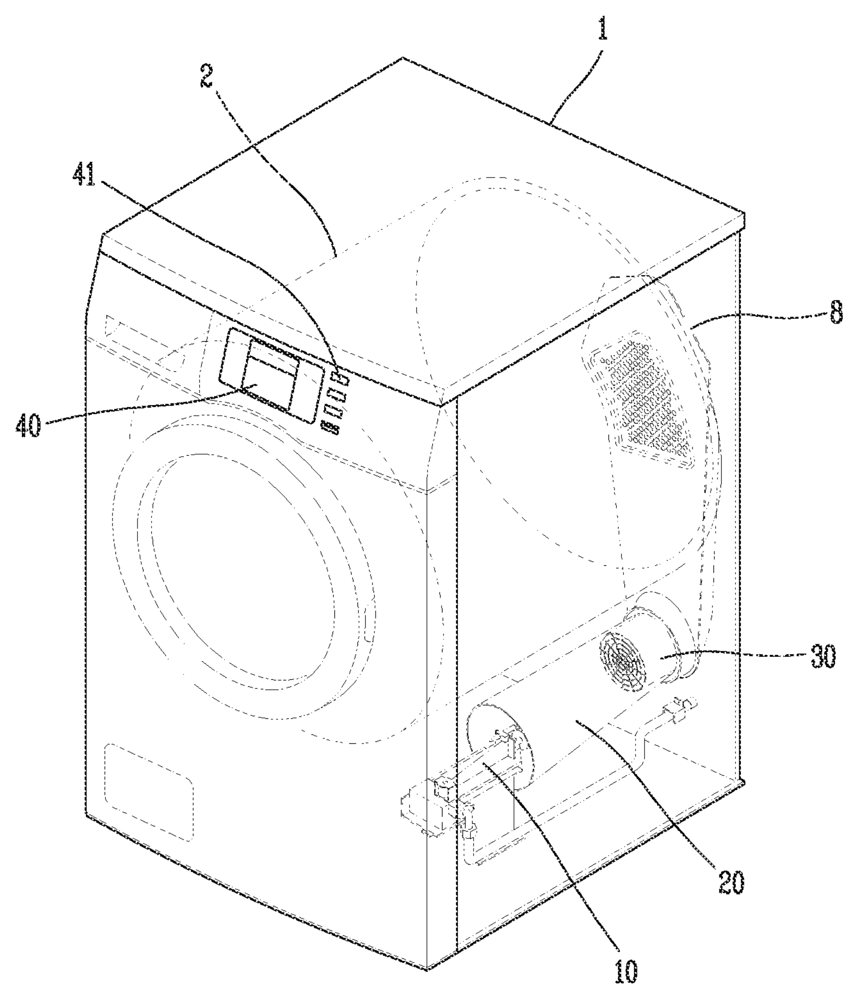
FIG. 2 is a perspective view illustrating the embodiment illustrated in FIG. 1.

FIG. 1 is a longitudinal cross-sectional view illustrating a clothes treating apparatus according to the present disclosure, and FIG. 2 is a perspective view illustrating the embodiment illustrated in FIG. 1. The embodiment illustrated in FIGS. 1 and 2 relates to a dryer having only a drying function, but the present disclosure may not be necessarily limited to the dryer, and may be also applicable to any clothes treating apparatus having a drying function for supplying high-temperature hot air into the drum using a burner.

Referring to FIGS. 1 and 2, the foregoing embodiment may include a cabinet 1 corresponding to the body of the dryer, and a drum 2 rotatably provided in the cabinet 1 to accommodate an object to be dried therein, a hot air supply unit 3 configured to form hot air supplied to the drum 2, and a heat exchanger 4 configured to dehumidify humid air exhausted from the drum 2 while at the same time cooling hot air. Here, the heat exchanger 4 will be omitted in case of including a duct for directly discharging the exhausted humid air out of the building or the like.

An inlet 1*a* for putting an object to be dried into the cabinet 1 is formed on a front surface of the cabinet 1, and a front cover 5 for supporting the front side of the drum 2 is provided around an inner surface of the inlet 1*a*, and an exhaust duct 6 for guiding humid air that has passed through the drum 2 to the outside of the cabinet 1 is provided at a lower side of the front cover 5.

Furthermore, a rear cover 7 for supporting the rear side of the drum 2 is provided on a rear inner wall surface of the cabinet 1, and a supply hole 7*a* is formed at the rear cover 7 to supply hot air into the drum 2. Furthermore, an intake duct 8 is provided on an rear outer wall surface of the cabinet 1 to communicate with the supply hole 7*a*, and the hot air supply unit 3 is provided at an inlet side of the intake duct 8.

Furthermore, a lint filter 9 for filtering out foreign substances from circulating air within the exhaust duct 6 is provided at the front cover 5, and the heat exchanger 4 for dehumidifying humid air guided to the exhaust duct 6 is provided at the exhaust duct 6.

In the foregoing embodiment, when power is supplied, the hot air supply unit 3 is operated to inhale and heat external air, and the heated air is guided to the side of the drum 2 through the intake duct 8. Hot air guided to the drum 2 is supplied into the drum 2 through the supply hole 7*a* provided at the rear cover 7, and the hot air dries the laundry while being heat-exchanged with wet clothes within the drum 2, and then humid air is guided to the side of the exhaust duct 6 provided inside the cabinet 1. The humid air is passed through the lint filter 9 located at an upper stream of the exhaust duct 6 to filter out foreign substances, and the humid air from which the foreign substances have been filtered out is discharged to the outside of the cabinet 1 along the exhaust duct 6. During the foregoing process, a series of processes in which the humid air is dehumidified while being passed through the heat exchanger 4 provided in the middle of the passage of the exhaust duct 6 and then discharged out of the cabinet 1 in a dry state will be repeated.

Figure 3:
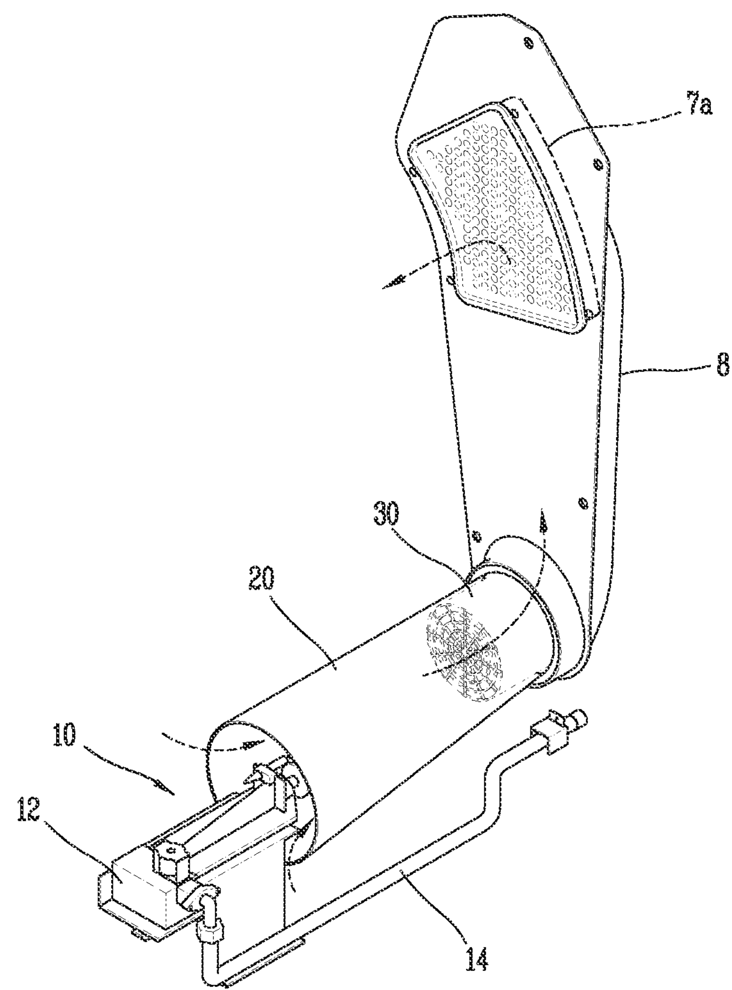
FIG. 3 is an enlarged perspective view illustrating a hot air supply unit in the embodiment illustrated in FIG. 1.

Here, as illustrated in FIGS. 2 and 3, the hot air supply unit 3 may include a burner 10 for burning fuels such as LNG to generate heat, and a heating duct 20 provided around a flame port of the burner 10 to heat air inhaled from the outside of the cabinet 1, and a catalyst burner 30 provided at an outlet side of the heating duct 20 to oxidize non-combusted gases, namely, harmful gases generated under imperfect combustion from the burner 10.

A typical burner for burning fuels such as natural gases by mixing them with air is used for the burner 10. Furthermore, the heating duct 20 is formed in a truncated conical shape in which the diameter of the inlet end is greater than that of the outlet end, and a flame port of the burner 10 is located and provided at the inlet end of the heating duct 20.

The catalyst burner 30 is inserted and fixed to an outlet side on the basis of the length direction of the heating duct 20, namely, a backwash side on the basis of the flow direction of the air, to minimize thermal deformation due to hot air.

Moreover, a linear valve 12 for adjusting the amount of gas supplied to the burner 10 is provided at a front end of the burner 10. The linear valve 12 is connected to a gas supply pipe 14 to linearly adjust the amount of supplied gas.

Figure 4:
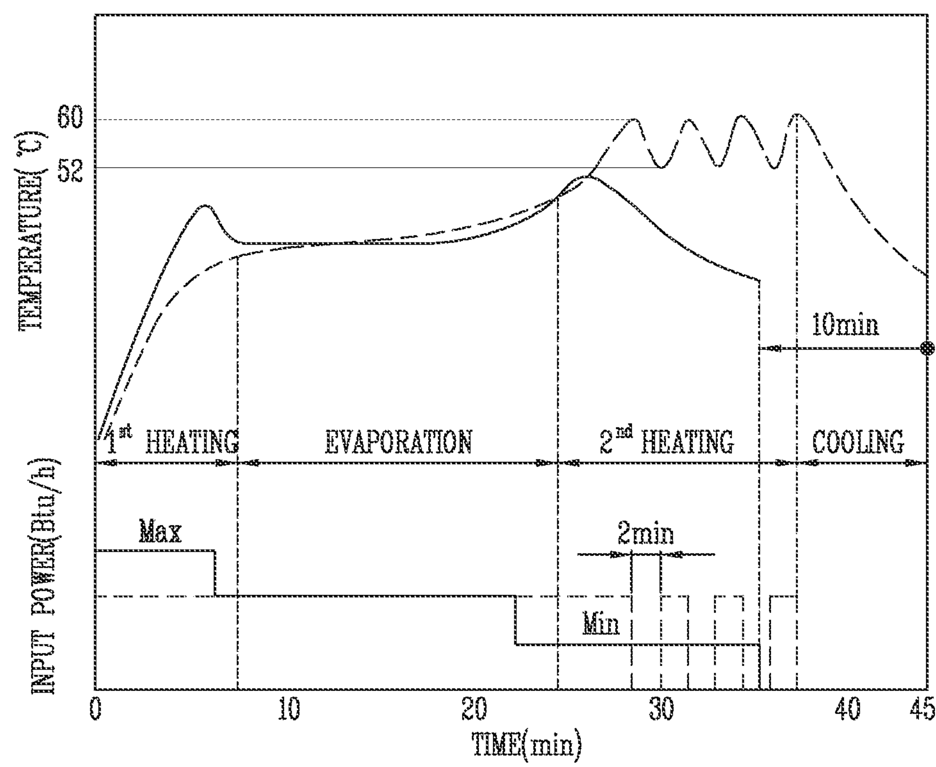
FIG. 4 is a graph in which a temperature change of exhaust air is measured according to the drying process in the embodiment illustrated in FIG. 1.

Hereinafter, the operation of the embodiment will be described. Here, a change of the exhaust temperature being exhausted during the drying process will be first described. Referring to FIG. 4, (for reference, a solid line in FIG. 4 denotes a graph regarding the foregoing embodiment, and a dotted line denotes a graph regarding a dryer employing an on-off valve in the related art), the supplied air is not sufficiently heated at the beginning of the drying process to have a low temperature, and accordingly, a moisture evaporation amount of the laundry put therein is low, and thus the temperature and humidity of the exhaust air is in a low state. However, since the amount of heat is continuously supplied by a gas burner, and a latent load is small, the temperature increase occurs at a relatively high speed. The section may be referred to as a first heating section as a matter of convenience.

Then, when the temperature of supplied hot air reaches a sufficient level enough to evaporate moisture, evaporation occurs from the laundry in a full scale. Accordingly, most of thermal energy contained in hot air is converted into latent heat due to a phase change of moisture, and the temperature of exhaust air is maintained in a substantially constant state. The section may be referred to as an evaporation section. Here, the temperature is gradually increased as approaching the latter half of the evaporation section when the evaporation of moisture is progressed, and thus the end time point of the evaporation section cannot be simply specified using only the temperature, and therefore, when a temperature increase rate is exhibited above a predetermined value in advance, it is determined that the evaporation section is terminated.

When the evaporation section is terminated, the latent load disappears, and thus the temperature of exhaust air is rapidly increased as shown in the first evaporation section. The temperature change behavior at this time is similar to the first evaporation section, and thus it may be referred to as a second evaporation section, and when the drying process is sufficiently carried out, the operation of the gas burner is suspended to perform cooling. On the other hand, according to the related art, as illustrated in FIG. 4, the gas supply amount is controlled using an on-off valve, and thus the valve is open at the same level over the entire drying process. Accordingly, the amount of gas supplied during the first heating section and evaporation section is maintained at a constant level.

However, the supplied gas amount is adjusted while repeating the switching of the on-off valve to prevent an excessive temperature increase during the second heating section. Due to this, the exhaust temperature repeats the increase and decrease during the second heating section. The excessive gas supply can be reduced by shortening the on-off period of the on-off valve, but there exists a physical limit in a time interval reaching the extinguishment and re-ignition as well as the combustion efficiency should be taken into consideration and as a result it may be impossible to reduce the time interval to the extent it is intended.

However, according to the foregoing embodiment, a larger amount of gas is supplied at the beginning of the drying process compared to the related art to reduce a time consumed for temperature increase. It is seen in the graph that a gradient of the curve during the first heating section is greater than that of the related art, and a time point at which the first heating section is terminated is earlier than that of the related art.

Then, the gas supply amount is reduced during the section in which the first heating section is terminated. At this time, the amount of supplied gas may be determined at a level enough to evaporate the laundry put therein. It may be accomplished by measuring the exhaust temperature and sensing the measured temperature change to control the gas supply amount.

When the evaporation section is terminated to enter the second evaporation section, the gas supply amount is reduced. In other words, latent loads are all disappeared during the second evaporation section, and thus only small energy is required compared to the evaporation section. Taking it into consideration, the gas supply amount can be reduced, and the resultant energy consumption amount can be reduced, thereby solving a problem due to the excessive temperature increase.

As illustrated in FIG. 4, according to an embodiment of the present disclosure shown in a solid line, the drying time point is 10 minutes earlier than that of the related art. Moreover, the consumed gas amount may be also reduced, and it will be described with reference to FIG. 5.

Figure 5:
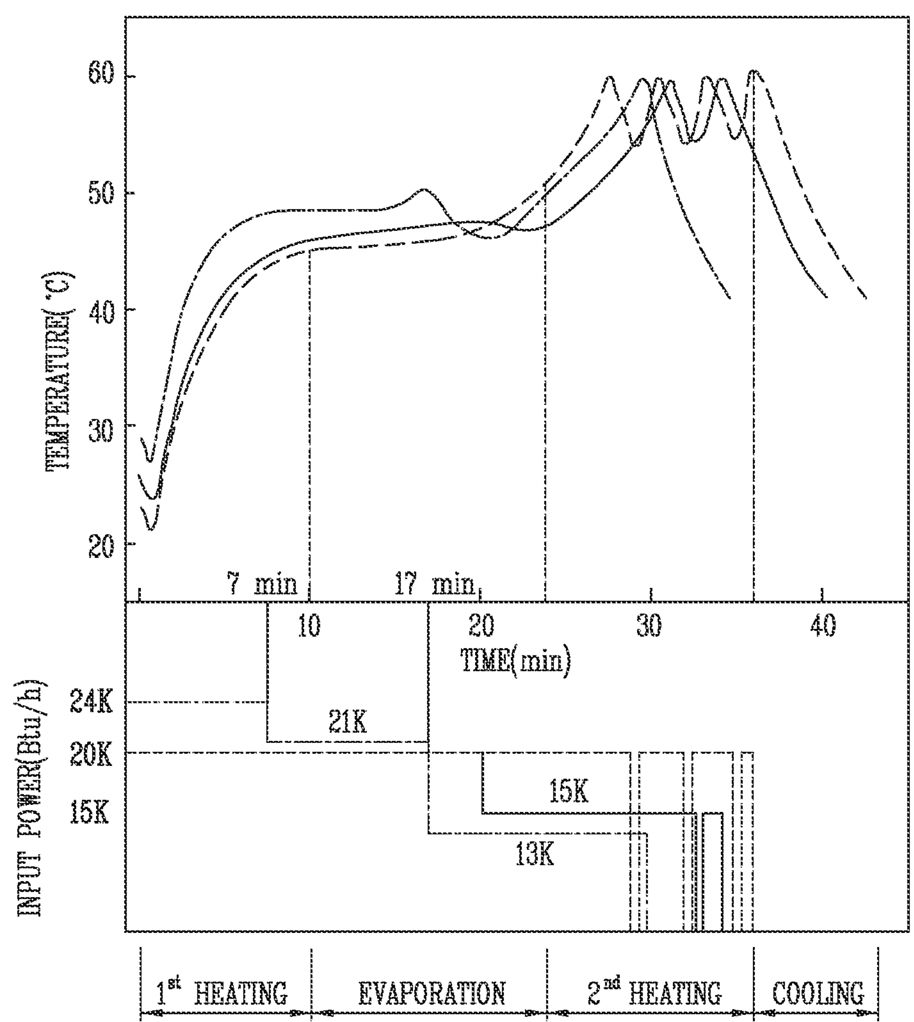
FIG. 5 is a graph illustrating a difference between temperature changes of exhaust air and gas supply amounts for each drying course in the embodiment illustrated in FIG. 1.

FIG. 5 is a graph illustrating a change of exhaust temperature and a change of gas supply amount in a dryer in the related art and the foregoing embodiment, in which the foregoing embodiment has two drying courses in FIG. 5. In other words, the drying course shown in a dash-dot line corresponds to a rapid course, and the drying course shown in a solid line corresponds to a saving course for reducing the energy consumption amount.

Specifically, the rapid course has a gas supply amount pattern similar to the foregoing course previously illustrated in FIG. 5, and the redundant description thereof will be omitted. However, there is a difference in that a gas supply amount during the evaporation section is larger than that of the related art. Furthermore, the amount of supplied heat is large during the first heating section in the rapid course, and thus it has a characteristic in which the duration time is shorter than those of the other two courses.

The saving course is similar to a conventional course in part of the first heating section and evaporation section, but there is a difference in that the gas supply amount is reduced at the end of the evaporation section. Specifically, there is a difference in that the amount of heat of 15000 btu per hour is supplied at the end of the evaporation section in the saving course whereas the amount of heat of 20000 btu per hour is supplied at the beginning of the evaporation section and second heating section in the conventional course.

As described above, a latent load is smaller compared to the beginning of the evaporation section since moisture contained in the laundry is evaporated to a certain extent at the end of the evaporation section. Accordingly, even when the amount of supplied heat is reduced, it is taken into consideration that it does not have a significant effect during the drying time. Furthermore, the saving course temporarily cuts off gas supply during the second heating section. It is to prevent an excessive temperature increase, and it may be also possible to maintain the gas supply amount at a constant level when the temperature increase rate is small.

The following Table 1 summarizes the fuel consumption amount and drying time consumed during the conventional course, rapid course and saving course. Here, the initial percentage of water content for the laundry put therein is 70%, and the weight thereof is 3.714 kg.

TABLE 1

| | Conventional course | Rapid course | Saving course |
|---|---|---|---|
| Fuel consumption amount ($ft^3$) | 11.13 | 10.57 | 10.04 |
| Drying time | 42 min 55 sec | 35 min 36 sec | 40 min 18 sec |
| Final percentage of water content | 0.92 | 0.92 | 0.92 |

As illustrated in the above Table 1, it is seen that both the two courses in the foregoing embodiment use a smaller amount of gas and complete the drying process within a shorter period of time compared to the related art.

Figure 6:
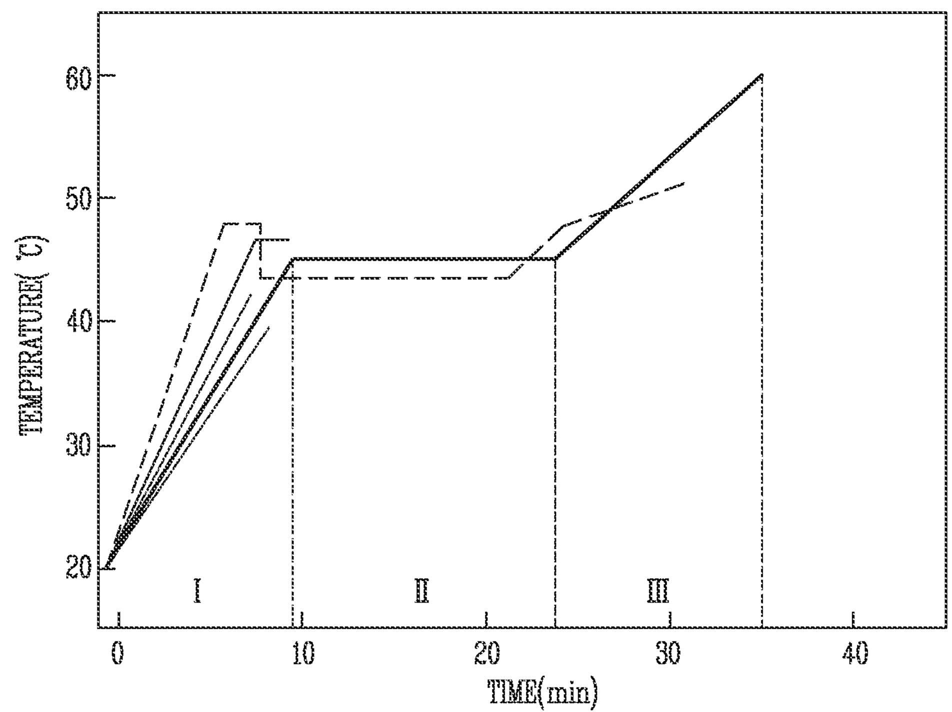
FIG. 6 is a graph illustrating a difference between temperature increase rates during the first heating section according to a load change.

On the other hand, the weight of the laundry put therein may be indirectly measured through a gradient in the first heating section even without using an additional weight sensor. In other words, when it is assumed that the same amount of heat is supplied, the temperature increase rate is smaller as increasing the amount of the laundry put therein, and thus a gradient in the first heating section will be reduced as a graph illustrated in FIG. 6. Accordingly, when a reference value is determined in advance, it may be possible to determine the weight of the laundry put therein only with the gradient of the graph.

Figure 7:
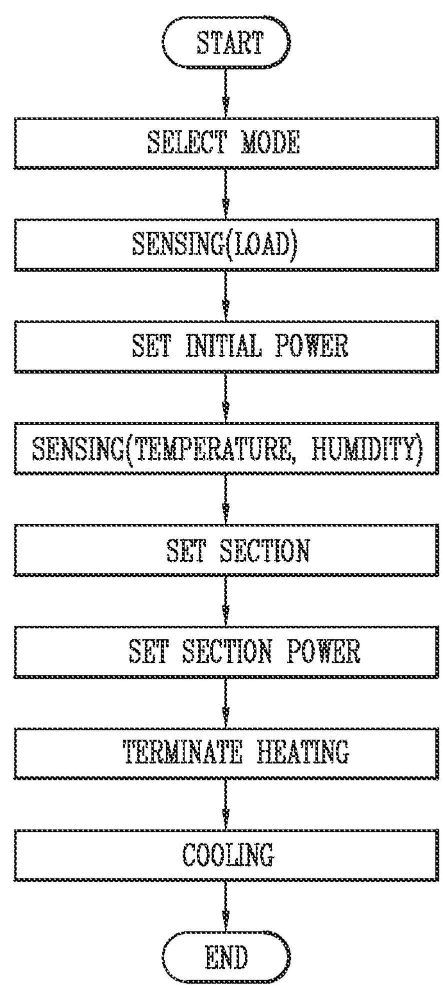
FIG. 7 is a flow chart illustrating a process in which drying is carried out according to the foregoing embodiment.

FIG. 7 is a flow chart illustrating a process in which drying is carried out according to the foregoing embodiment, wherein the weight of the laundry put therein is determined by checking a course entered by the user through a course selection means provided in the manipulation panel in the initial stage, and then supplying a previously determined amount of heat and measuring a temperature increase rate.

The amount of heat to be supplied in the initial stage is determined based on the determined weight, and gas suitable to the amount of heat is supplied to start the drying process. During the process, the degree of drying is recognized based on the measured percentage of water content in the laundry through the temperature of air exhausted from the drum and the electrode sensor or the like, to determine that the measured time point corresponds to which one of the first heating section, the evaporation section and the second heating section.

When the section is determined, the gas supply amount is adjusted according to the entered course to maintain the drying process, and when the final percentage of water content reaches a target degree of drying, the operation of the burner is suspended to cool the inside of the drum.

What is claimed is:

1. A clothes treating apparatus, comprising:

a drum configured to accommodate an object to be dried;

a valve configured to adjust an amount of gas supplied through the valve;

a burner configured to burn gas supplied to the burner through the valve;

a heating duct configured to supply air heated by the burner to the drum;

a temperature sensor configured to measure a temperature of air exhausted from the drum;

a manipulation panel that includes a course selection button configured to select a drying course that is a rapid course for shortening the drying time or a drying course that is a saving course for reducing a gas consumption amount; and a controller configured to adjust an amount of gas supplied to the burner based on a temperature measured by the temperature sensor by:

controlling a drying process in a plurality of sections based on a temperature change of air exhausted from the drum, and controlling the valve to vary, for each section, the amount of gas supplied to the burner based on a selected drying course, wherein the plurality of sections comprise:

a first heating section that is configured to have a temperature increase rate, and occurs at a beginning of the drying process;

an evaporation section that is configured to have a constant temperature increase rate, and occurs subsequent to the first heating section; and a second heating section that is configured to have a temperature increase rate, and occurs subsequent to the evaporation section, wherein, in response to the rapid course being selected, the amount of gas supplied is reduced by three stages based on the plurality of sections, a first gas supply amount being supplied to the burner during the first heating section, a second gas supply amount which is less than the first gas supply amount being supplied to the burner during the evaporation section, and a third gas supply amount which is less than the second gas supply amount being supplied to the burner during the second heating section, and wherein, in response to the saving course being selected, the amount of gas supplied is reduced by two stages based on the plurality of sections, a first gas supply amount being supplied to the burner during the first heating section and the beginning of the evaporation section, and a second gas supply amount which is less than the first gas supply amount being supplied to the burner during the end of the evaporation section and the second heating section.

2. The clothes treating apparatus of claim 1, wherein the controller is configured to control the valve to supply a highest amount of gas during the first heating section.

3. The clothes treating apparatus of claim 1, wherein the controller is configured to control the valve to vary, for each section, the amount of gas supplied to the burner by controlling the valve to supply a second amount of gas to the burner during the second heating section and controlling the valve to supply a first amount of gas to the burner during the evaporation section, the second amount of gas being less than the first amount of gas.

4. The clothes treating apparatus of claim 1, wherein the controller is configured to control the valve to supply a lowest amount of gas during the second heating section.

5. The clothes treating apparatus of claim 1, wherein an amount of gas supplied in each section is constantly maintained for each respective section.

6. The clothes treating apparatus of claim 1, wherein the controller is configured to determine a weight of an object to be dried in the drum based on a temperature increase rate at a beginning of the first heating section, and determine an initial gas supply amount based on the determined weight.

7. The clothes treating apparatus of claim 6, wherein the controller is configured to determine the weight of an object to be dried in the drum based on the temperature increase rate at the beginning of the first heating section by determining the weight of an object to be dried in the drum based on a temperature increase rate per hour at the beginning of the first heating section.

8. The clothes treating apparatus of claim 1, wherein the valve comprises a linear valve configured to linearly adjust the amount of gas supplied through the linear valve.

9. The clothes treating apparatus of claim 1, wherein the controller is configured to partition the drying process into the plurality of sections based on a temperature change of the air exhausted from the drum.

10. The clothes treating apparatus of claim 1, wherein the controller is configured to control the valve to vary, for each section, the amount of gas supplied to the burner, for the selected drying course, by controlling gas supply amounts during the first heating section and the evaporation section to be the same based on the selected drying course being the saving course, wherein the saving course has a lower gas supply amount during the end of the second heating section than a gas supply amount during the first heating section and the beginning of the evaporation section.

* * * * *